US006741633B1

(12) United States Patent
Cangiani et al.

(10) Patent No.: US 6,741,633 B1
(45) Date of Patent: May 25, 2004

(54) HOP OVERLAY SIGNAL STRUCTURE FOR INCLUDING ADDITIONAL SIGNALING CHANNELS IN CODE DIVISION MULTIPLE ACCESS COMMUNICATION AND NAVIGATION SYSTEMS

(75) Inventors: Gene L. Cangiani, Parsippany, NJ (US); Lawrence J. Doyle, Hazlet, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/266,360

(22) Filed: Mar. 11, 1999

(51) Int. Cl.$^7$ ................................................ H04B 1/69
(52) U.S. Cl. ........................................................ 375/132
(58) Field of Search ........................... 375/133, 134, 375/132, 131, 139; 342/357.15, 357.06

(56) References Cited

U.S. PATENT DOCUMENTS

| | | | |
|---|---|---|---|
| 5,528,599 A | * | 6/1996 | Rodriguez et al. .......... 714/712 |
| 5,612,978 A | * | 3/1997 | Blanchard et al. .......... 375/350 |
| 5,640,385 A | * | 6/1997 | Long et al. .................. 370/335 |
| 5,757,916 A | * | 5/1998 | MacDoran et al. ......... 380/258 |
| 5,995,533 A | * | 11/1999 | Hassan et al. ............... 375/140 |
| 6,044,071 A | * | 3/2000 | Spilker, Jr. ................... 370/320 |
| 6,111,909 A | * | 8/2000 | Taki ............................ 375/132 |
| 6,289,038 B1 | * | 9/2001 | Park ........................... 375/131 |
| 6,327,312 B1 | * | 12/2001 | Jovanovich et al. ........ 375/316 |
| 6,490,314 B1 | * | 12/2002 | Khayrallah et al. ......... 375/132 |

* cited by examiner

Primary Examiner—Emmanuel Bayard
(74) Attorney, Agent, or Firm—Edell, Shapiro & Finnan, LLC

(57) ABSTRACT

A new signal format that allows sharing of spectrum with CDMA signals with a minimum amount of mutual interference and a maximum amount of processing gain. The method including the step of coherently frequency hopping a narrow band signal adapted to minimize interference with a main lobe of the CDMA code over the allocated bandwidth. A particular application of this provides a method for enabling a global positioning device adapted to receive an allocated bandwidth to directly acquire a to P(Y) code when an associated C/A signal is effectively jammed.

23 Claims, 4 Drawing Sheets

COHERENT FREQUENCY HOP WAVEFORMS

HOP OVERLAY SIGNAL STRUCTURE FOR INCLUDING ADDITIONAL SIGNALING CHANNELS IN CODE DIVISION MULTIPLE ACCESS COMMUNICATION AND NAVIGATION SYSTEMS

FIELD OF INVENTION

The present invention relates to code division multiple access ("CDMA") communications and navigation systems and more particularly to a hop overlay signal structure generation for a global positioning system.

BACKGROUND OF THE INVENTION

Due to the general lack of available frequency spectrum, there is a need to provide additional signaling capability by means of sharing frequency bands. For example, the current signal structure for the Global Positioning System (GPS) consists of two downlink L-Band signals, designated L1 and L2. L1 is Quadrature Phase Shift Key ("QPSK") modulated with two separate codes, the C/A code (for general use) and the P(Y) code (for authorized use only).

The P(Y) code is extremely long and requires either a precise timing reference or handoff from the C/A code. Conventional military receivers acquire the C/A code first, and then transition to the more precise P(Y) code for their navigation solution. Currently, L2 only contains the P(Y) code, and is hence for authorized use only. As is known to those possessing ordinary skill in the art though, full navigational accuracy requires dual frequency downlinks in order to remove the effects of the ionospheric delay, for example.

The additional capability that is required for civilian users is the provision of a second and, possibly a third, civilian frequency, such that accurate ionospheric correction is possible for these users as well. Since additional L-Band spectrum is at a premium, L2 has been designated as one of the additional civilian frequencies. Adding a C/A code to L2, making it identical to L1, would provide additional civilian capability. However, the military requires the ability to prevent hostile use of GPS in specific geographic regions and requires the ability to protect friendly use of GPS in highly jammed environments.

This requirement can be met with the inclusion of an additional military signal on L2 and/or on L1. This new signal preferably has substantial anti-jam (AJ) characteristics, such that authorized users can still acquire it when the C/A codes are jammed, while having minimal effect on the existing C/A codes and P(Y) codes.

New signal structures under consideration by the Air Force include an additional wideband, direct sequence, spread spectrum signal to serve as the new military signal. One of the signal structures under consideration includes the "tricode hexaphase" arrangement wherein the new military signal is encoded with a Manchester code, such that it has a null at the carrier frequency so as to lessen the interference with the C/A code.

This is a variant of the more general scheme known as Binary Offset Carrier or BOC. BOC signals are generated by multiplying a conventional pseudo random (PN) sequence by a square wave in order to move the spectral peak away from the carrier. This lessens the mutual interference with the C/A code. The resultant waveform has 2 spectral peaks on either side of the carrier, wherein the offsets from the carrier are equal to the square wave frequency and the width of each at the two main lobes is determined by the chipping rate of the PN sequence.

Another scheme, the "Spilker signal", splits the C/A code into two spectral components that are positioned on either side of the carrier, each centered at the P(Y) code nulls.

It should be readily recognized, that although these schemes for sharing spectrum attempt to minimize mutual interference between the various signals by offsetting the spectral peaks of the various signals, the residual interference when three wideband signals share the same band is sufficient to compromise overall system performance.

SUMMARY OF THE INVENTION

A new signal format that allows sharing of spectrum with CDMA signals with a minimum amount of mutual interference. A particular application of this concept provides a method for enabling use of a global positioning system including a plurality of satellites each of which transmit at least a first navigational signal on a plurality of channels and a second navigational signal on at least one of said plurality of navigational channels, wherein acquisition of said first navigational signal is typically required for acquisition of said second navigational signal, in an environment sufficiently jammed to inhibit effective acquisition of said first navigational signal, said method including the step of coherently frequency hopping a narrow band signal including sufficient information to enable direct acquisition of the second navigational signal and adapted to minimize interference with the first and second navigational signals over the channel bandwidth.

DETAILED DESCRIPTION OF THE INVENTION

Figure 1:
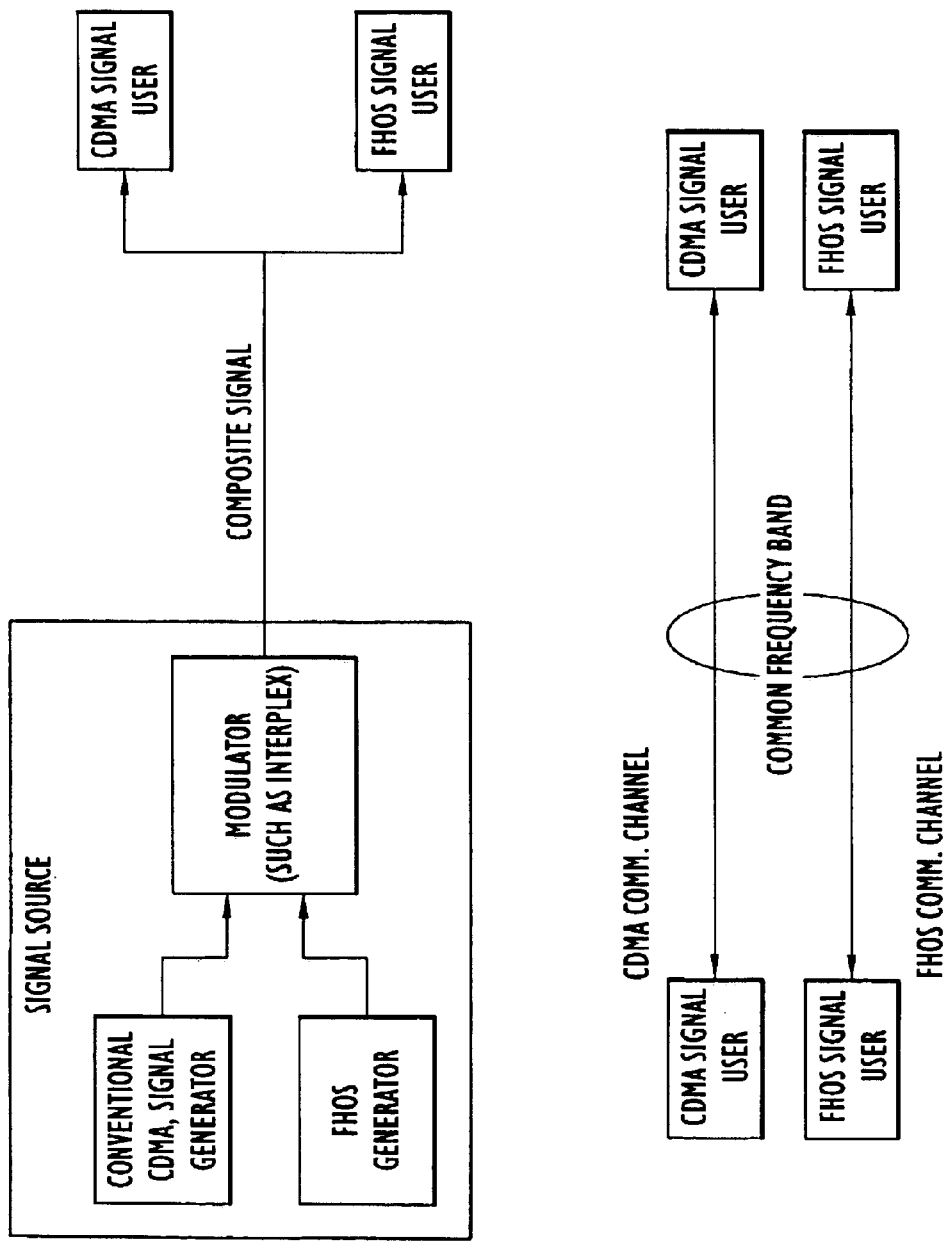
FIG. 1 generally illustrates the concept of overlaying a coherent frequency hopped signal onto a CDMA signal as is utilized according to the present invention.

Referring now to the numerous figures wherein like references refer to like elements of the invention, FIG. 1 illustrates that the present invention utilizes a relatively narrow band signal as an overlay to the wide band CDMA signals, minimizing the mutual interference and thereby improving performance over any configuration that attempts to combine three or more wide band signals. In the case of its potential application for GPS, this narrow band signal is frequency hopped over the L2 and/or L1 allocated bandwidth, but avoids the central 2 MHZ of the band so as to minimize interfere with the main lobe of the existing C/A code.

Direct sequence spread spectrum signals, such as the C/A code, are very immune to narrow band interference outside of the main lobe. Although the new signal is contained within the main lobe of the P(Y) code, it is so much more narrow than the width of the P(Y) code main lobe that the effect on P(Y) code operation is insignificant. Performance akin to wideband direct sequence systems is achieved by utilizing "coherent frequency hopping" to achieve large processing gains. As described below, the ability to perform correlation over long time periods (across many hops), in the receiver affords large processing gains with minimal mutual interference with the existing wide band, direct sequence, signal components.

In application to GPS, the new signal structure preferably includes a narrow band, frequency hopped signal that is contained in the L1 and/or L2 bandwidth. This signal is preferably broadcast as an overlay to the existing GPS L2 signal in times of military conflict, or when selective reception is desired. The signal could be broadcast globally or could be confined to specific theaters of operation.

The signal could be generated from geostationary orbit, or from the GPS satellites, or even from local platforms. Since the new signal affords much more processing gain than the C/A code, and since its frequency is changing with a secure hopping pattern, it is much more jam resistant than the C/A code. Therefore, authorized users will still be able to acquire this new signal when the C/A codes on L1 and L2 are totally jammed.

In fact, it should be recognized that intentional localized jamming of the C/A codes in theaters of operation can be used very effectively to prevent hostile use, without compromising friendly usage of GPS, since friendly users can acquire the hop overlay signal.

Once the hop overlay signal is acquired, it can be demodulated and decrypted to obtain the hop overlay data stream. This data can contain precise time reference data that in turn would allow authorized users to perform direct P(Y) code acquisition on L1 and/or L2. The net result is that, in the local theaters of operation, hostile access has been totally denied, but authorized users with new hop overlay enabled receivers enjoy full accuracy with P(Y) code operation on L1 and L2.

The present invention includes generating the new frequency hopped signal coherently, such that every frequency in the hopping pattern starts with a deterministic, repeatable phase. This allows the use of a correlation receiver and correlating across the entire hopping pattern, which affords the relatively large processing gain required. Processing gain is a measure of the ability to acquire the signal in a noisy (or jammed) environment. Processing gain can be further increased by further modulating the coherent frequency hopped signal with a relatively low chipping rate PN sequence. The technique for acquisition of the hop overlay signal calls for correlating the incoming signal with a locally generated version of the secure hopping pattern at if. As long as the receiver signal generator produces the same deterministic phase transitions between the various hop frequencies as the signal generator in the transmitter, the correlator will produce a large correlation peak when the phases of the two signals coincide.

Figure 2:
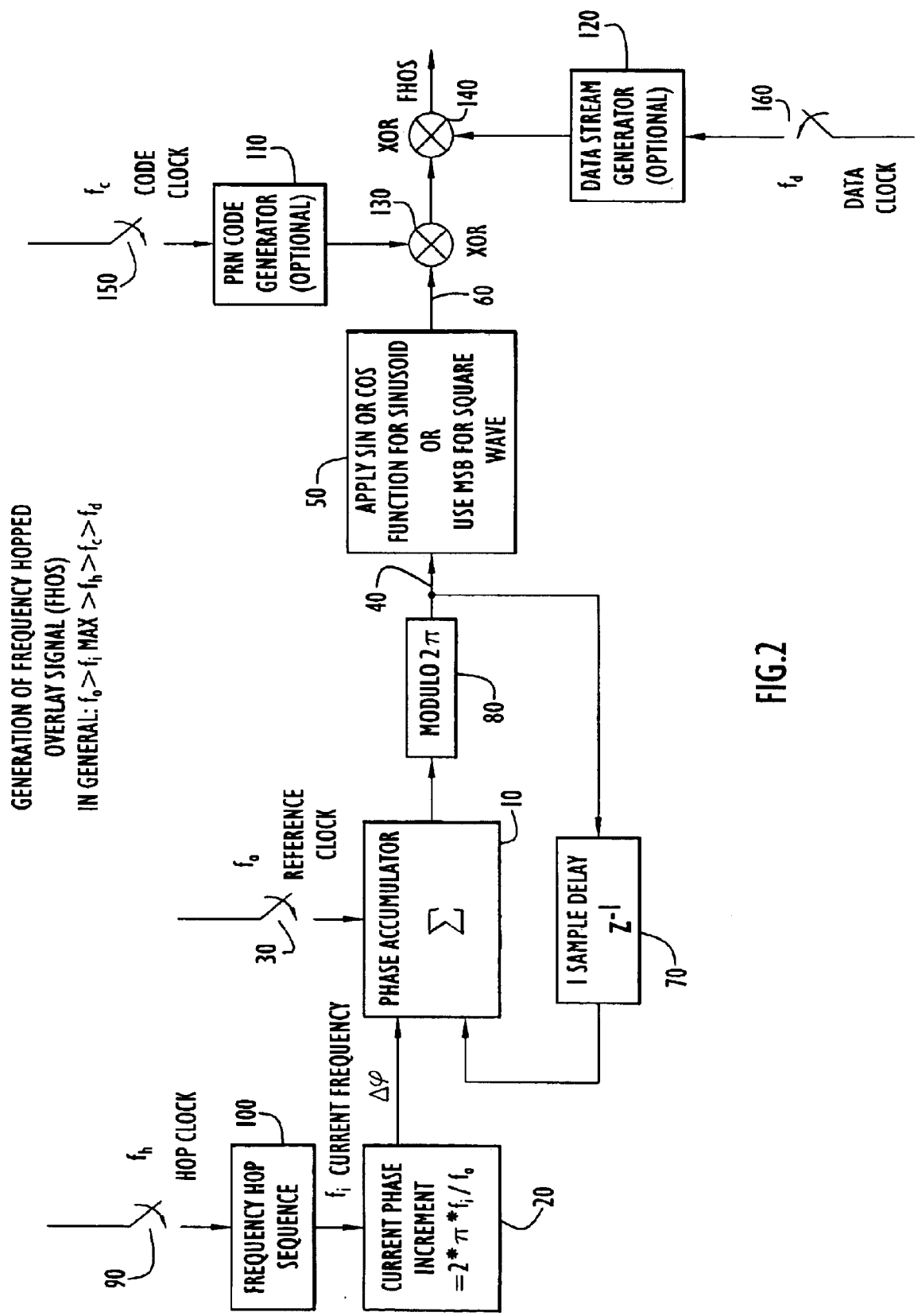
FIG. 2 illustrates a block diagram for implementing the method according to the present invention.

Referring now to FIG. 2, therein is illustrated a preferred form of generating the frequency hopped signal according to the present invention. To generate a sinusoidal waveform using digital means, phase accumulator 10 is utilized to increment a value by a phase increment $\Delta\phi$ defined by a phase increment device 20 responsively to a reference clock 30. The sine or cosine of an output 40 can be determined 50 to generate the output 60. Alternatively, a most significant bit ("MSB") determination could be used to generate a square wave. The delay stage 70 is implemented to allow the accumulation of the phase value 40 in the phase accumulator 10. The modulo block 80 is utilized to reset the phase value 40 after a full period of the output (i.e. $2\pi$)

The frequency of the output 60 (be that sinusoidal if a sine or cosine is applied, or square if MSB determination is used) is dependent upon the frequency of the reference clock 30 and phase increment value $\Delta\phi$. The higher the frequency of the reference clock 30 is, or the greater the value of $\Delta\phi$, the higher the frequency of the output 60 will be.

Preferably, the frequency of the reference clock 30 is fixed, and hence to implement frequency hopping the phase increment $\Delta\phi$ needs to be changed. To implement this change in $\Delta\phi$, the phase increment device 20 is preferably responsive to a frequency hop clock 90, which indicates when $\Delta\phi$ should be changed. Preferably a device 100 is utilized to provide the sequence for the frequency hopping to be implemented to the phase increment device 20, which then generates $\Delta\phi$ based upon the current frequency $f_i$ being applied to the phase increment device 20 and frequency $f_o$ of the reference clock 30. If a pseudo random code is desired to be implemented, a pseudo random code supplied by a pseudo random code generator 110 can be mixed with the output 60 using a mixer 130. Preferably, the pseudo random code generator 110 is responsive to a code clock 150. Further, if a data stream is desired to be provided according to the present invention, it can be provided by a data stream generator 120 and mixed with the output 60 using a mixer 140. Alternatively, both a pseudo random code and data stream could be mixed with the output 60 to generate the ultimate output FHOS.

Preferably, $$\Delta\phi = 2\pi \frac{f_i}{f_o}, \text{ and} \tag{1}$$

$$f_{o>f_i} \max > f_{h>f_c>f_d} \tag{2}$$

where $f_h$ is the frequency of the hop clock 90, $f_c$ is the frequency of the code clock 150 and $f_d$ is the frequency of the data clock 160.

Figure 3A:
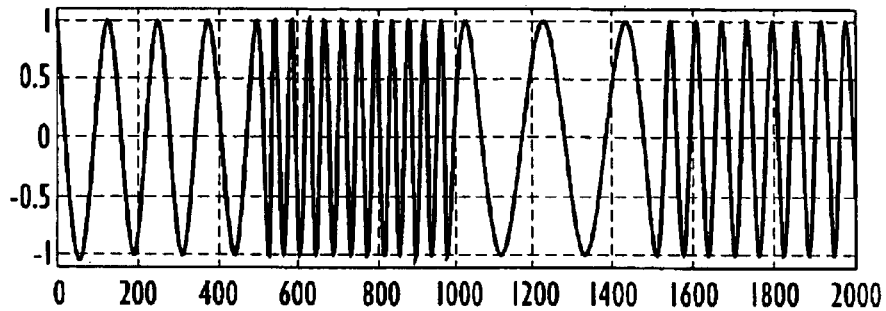
FIG. 3 illustrates the use of sinusoid waveform according to the present invention.
FIG. 3B illustrates the use of square waveform according to the present invention.
Figure 3B:
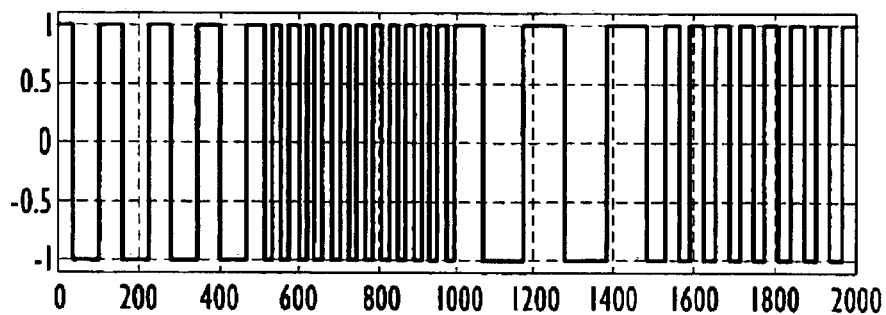

As illustrated in FIGS. 3A and 3B, the actual waveshape of the coherent frequency hopping signal can be sinusoidal, or square, or any convenient shape that can be reproduced in the receivers.

Additionally, this new composite signal structure for L2 (and/or L1 for that matter) can be generated using the waveform generator and combined with the C/A and P(Y) code using the interplex modulation technique which has been described in great detail in copending U.S. patent application Ser. No. 09/205,510, filed Dec. 4, 1998 and entitled PROGRAMMABLE WAVEFORM GENERATOR FOR A GLOBAL POSITIONING SYSTEM, the entire disclosure of which is incorporated by reference herein. The resultant signal has a constant envelope, such that highly efficient saturated amplifiers can be utilized for transmission of the signal.

A particular implementation of the coherent frequency hopped waveform has been developed for a simulation study to compare the new signal format with the tricode hexaphase signal (one of the current leading candidates for the new military acquisition signal). Since one of the security features that may be eventually utilized with this signal is to gradually replace the code, the following consideration governed the choice of frequencies. If the gradual code replacement security feature is applied by replacing one of the frequencies, then the phase sequence from that point to the end of the code would be disrupted and the coherency advantage would be lost. Similarly, if code replacement is effected by swapping 2 of the frequencies, the phase would be disrupted for the code length that resides between the 2 swapped frequencies, unless the set of hop frequencies has the following property: all of the frequencies that are used in the sequence are such that an integral number of cycles is contained in each hop interval. Then the accumulated phase at the end of each hop interval is exactly $2\pi$, and frequencies in the hop sequence can be swapped with impunity. This signal format has been named the "Permuted Chirp Code" and it represents a particular implementation of the coherent frequency hopped overlay signal.

The following signal parameters represent a preliminary set that were used to generate the results depicted in FIG. 4 and described below. The Permuted Chirp Code used in this preliminary simulation is generated with a 40.92 MHZ reference clock. The code consists of square waves with 31 frequency hops, with each hop interval consisting of 132 reference clock ticks. The 31 hop frequencies are multiples of 0.31 MHZ, from 0.93 MHZ to 10.23 MHZ. The lowest frequency produces exactly 3 cycles in one hop interval, and the highest produces exactly 33 cycles in one hop interval. Different satellites would have different permutations of the 31 frequencies. The resultant code is also modulated with a low rate pseudorandom sequence (prn), as shown in FIG. 2. For this preliminary implementation, an m-sequence of length 31 was used for the prn. The resultant code length is 0.1 msec and it consists of square waves that span the approximate frequency range 1 to 10 MHZ, with further modulation by a 310 kHz prn sequence. These parameters are by no means final, and they will be modified as the development progresses in order to optimize correlation properties, spectral characteristics, and anti-jam performance, while minimizing the expected impact on military receiver design.

Figure 4:
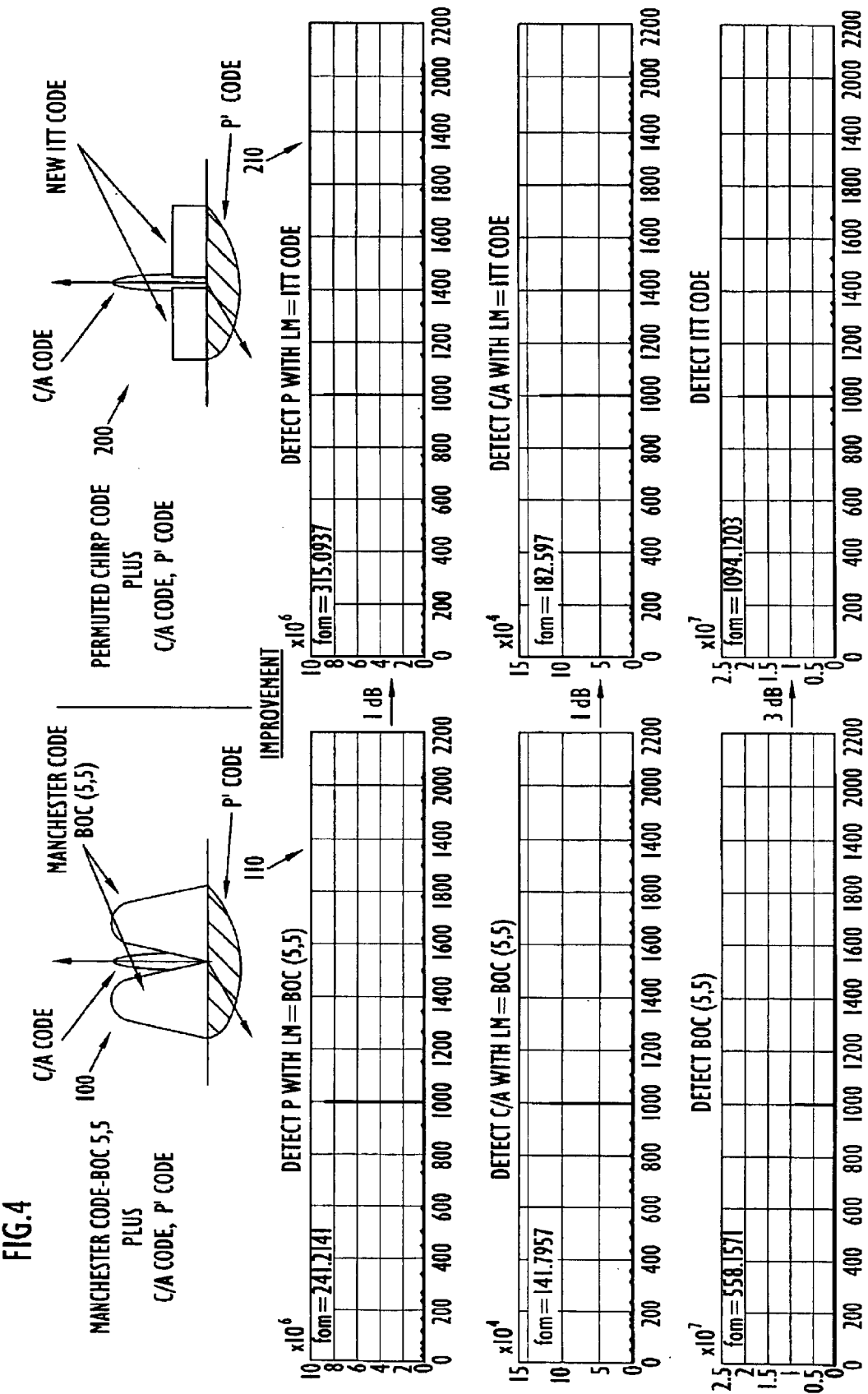
FIG. 4 illustrates a comparison between the method according to the preferred embodiment of the present invention and a method utilizing BOC(5,5).

Referring now also to FIG. 4, and for purposes of comparison, the present invention will be compared to the earlier discussed tricode hexaphase (Manchester, or Binary Offset Carrier, BOC 5,5) code method.

For purposes of comparison the composite signals have been generated using Interplex Modulation with typical power ratios, i.e. LM signal power=2×C/A power, and C/A power=2×P' power. The P' signal is a signal component that sufficiently emulates P(Y) for simulation purposes and was generated by chipping a Gold code at 10 MHZ.

The BOC (5,5) signal was generated by chipping a Gold code at 5 MHZ and modulating it with a 5 MHZ square wave. Performance is assessed by measuring the relative ability to detect each of the signal components for each of the composite signals using a correlation detector.

A Figure of Merit (FOM) can be defined as the ratio of the correlation peak magnitude to the rms background level. In this way, the FOM is indicative of the relative anti-jam (AJ) characteristics of the various signal combinations.

It should further be noted that the integration time for detection of each signal component was maintained constant at 1 msec—1 repetition of C/A code, 10 repetitions of the P' code, 5 repetitions of the BOC (5,5) code, and 10 repetitions of the Permuted Chirp Code implemented according to the preferred embodiment of present invention.

Therein, chart 100 illustrates a central carrier (i.e. L1 and/or L2) modulated with a C/A code and P' code. It further is modulated by a Manchester code, (BOC (5,5)). Referring now also to chart 110, the FOM for the P' code is 241.2141, the FOM for the C/A code is 141.7957 and the FOM for the BOC (5,5) code is 558.1571.

In contrast, chart 200 illustrates the same central carrier (i.e. L1 and/or L2) modulated with a C/A code and P' code, and further modulated using the Permuted Chirp Code implementations of coherent frequency hopping according to the present invention. Referring now also to chart 210, the FOM for the P' code is 315.0937, the FOM for the C/A code is 182.597 and the FOM for the coherent frequency hopped code is 1094.1203.

As will be evident to one possessing ordinary skill in the pertinent art, this represent approximately a 1 dB improvement in both the C/A and P' codes and approximately a 3 dB gain in the new signal, all resulting from less interference between the new signal and the C/A and P' codes and from more processing gain with the new signal than with the tricode hexaphase signal.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A method for substantially simultaneously receiving first and second signals in a same band, the first signal having a narrower bandwidth than the second signal, the method comprising:
   (a) receiving and processing the first signal to detect data contained in the first signal, wherein the first signal is coherently frequency hopped within said same band such that every frequency in a hopping pattern of the first signal starts with a deterministic, repeatable phase; and
   (b) simultaneously receiving and processing the second signal without substantial interference from the first signal.

2. The method of claim 1, wherein the first signal is a narrow band signal and the second signal is a non-frequency-hopped wide-band signal.

3. The method of claim 1, wherein the second signal is a code division multiple access (CDMA) signal.

4. The method of claim 1, further comprising:
   (c) receiving and processing a third signal in said same band without substantial interference from the first signal.

5. The method of claim 1, wherein a frequency hopping pattern of the first signal avoids a central portion of said same band to minimize interference with a main lobe of the second signal.

6. The method of claim 1, wherein the first signal contains timing reference information for acquiring the second signal.

7. The method of claim 1, wherein the first signal is modulated with a pseudonoise code.

8. The method of claim 1, wherein the first signal is a sinusoidal waveform.

9. The method of claim 1, wherein the first signal is a square wave waveform.

10. The method of claim 1, wherein the first and second signals are received within a composite signal having a constant envelope.

11. The method of claim 1, wherein the second signal is a direct sequence spread spectrum signal.

12. The method of claim 1, wherein the second signal is a global positioning system (GPS) navigation signal.

13. The method of claim 12, wherein said same band is either of the GPS L1 and L2 bands.

14. The method of claim 13, wherein the second signal is a GPS C/A code, and wherein a frequency hopping pattern of the first signal avoids a central portion of said same band to minimize interference with a main lobe of the GPS C/A code.

15. The method of claim 13, wherein the second signal is a GPS P(Y) code, and the first signal contains time reference data for acquiring the GPS P(Y) code.

16. The method of claim 1, wherein the first signal is transmitted from one of: a geostationary satellite, a GPS satellite; and a local platform.

17. A method for substantially simultaneously receiving first and second signals in a same band, the first signal having a narrower bandwidth than the second signal, the method comprising:

(a) receiving and processing the first signal, wherein the first signal is frequency hopped within said same band; and (b) simultaneously receiving and processing the second signal without substantial interference from the first signal, wherein the first signal is used to acquire the second signal in the presence of jamming.

18. The method of claim 17, wherein the first signal is a narrow band signal and the second signal is a non-frequency-hopped wide-band signal.

19. The method of claim 17, wherein the first signal contains timing reference information for acquiring the second signal.

20. A method for substantially simultaneously receiving first and second signals in a same band, the first signal having a narrower bandwidth than the second signal, the method comprising:

(a) receiving and processing the first signal, wherein the first signal is a permuted chirp code and is frequency hopped within said same band; and (b) simultaneously receiving and processing the second signal without substantial interference from the first signal.

21. The method of claim 20, wherein the first signal is a narrow band signal and the second signal is a non-frequency-hopped wide-band signal.

22. The method of claim 20, wherein the first and second signals are received within a composite signal having a constant envelope.

23. A method for substantially simultaneously receiving first and second signals in a same band, wherein the second signal is a global positioning system (GPS) navigation signal and said same band is either of the GPS L1 and L2 bands, the first signal having a narrower bandwidth than the second signal, the method comprising:

(a) receiving and processing the first signal, wherein the first signal is frequency hopped within said same band; and (b) simultaneously receiving and processing the second signal without substantial interference from the first signal, wherein the second signal is a GPS P(Y) code, the first signal contains time reference data for acquiring the GPS P(Y) code, and the first signal permits direct acquisition of the GPS P(Y) code when a GPS C/A code is being jammed.

* * * * *